No. 618,089. Patented Jan. 24, 1899.
R. H. HASLAM.
COFFEE OR TEA EXTRACTOR.
(Application filed Apr. 11, 1898.)
(No Model.)

WITNESSES.
Matthew M. Blunt.
C. M. Wilbur.

INVENTOR.
Robert H. Haslam,
By O. M. Shaw.
ATT'Y.

United States Patent Office.

ROBERT H. HASLAM, OF TAUNTON, MASSACHUSETTS.

COFFEE OR TEA EXTRACTOR.

SPECIFICATION forming part of Letters Patent No. 618,089, dated January 24, 1899.

Application filed April 11, 1898. Serial No. 677,140. (No model.)

*To all whom it may concern:*

Be it known that I, ROBERT H. HASLAM, of Taunton, in the county of Bristol and State of Massachusetts, have invented certain new and useful Improvements in Coffee or Tea Extractors, of which the following is a description sufficiently full, clear, and exact to enable any person skilled in the art or science to which said invention appertains to make and use the same, reference being had to the accompanying drawings, forming part of this specification, in which—

Figure 1:
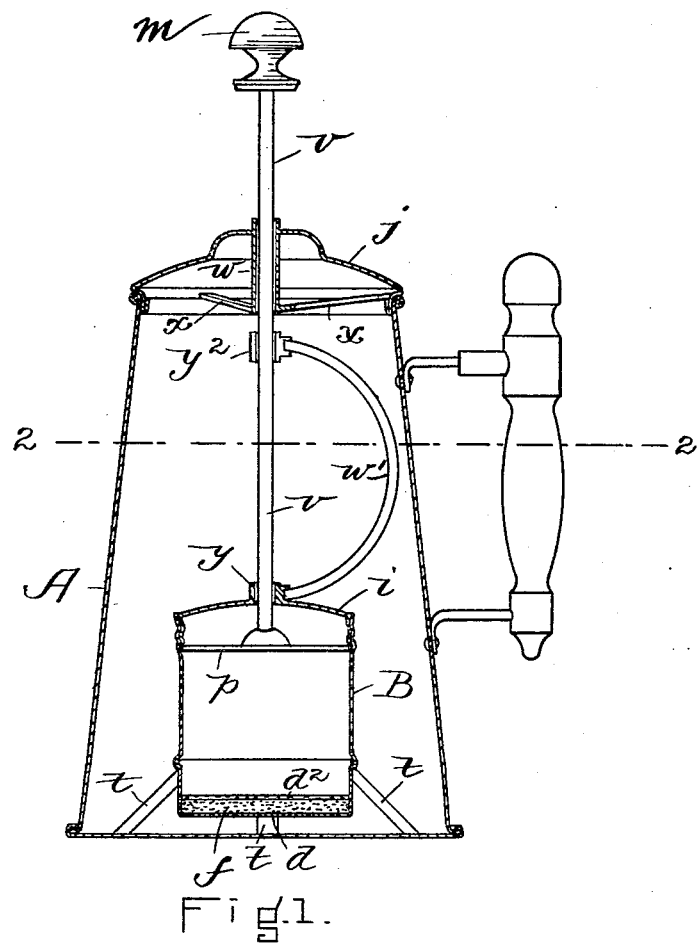
Figure 2:
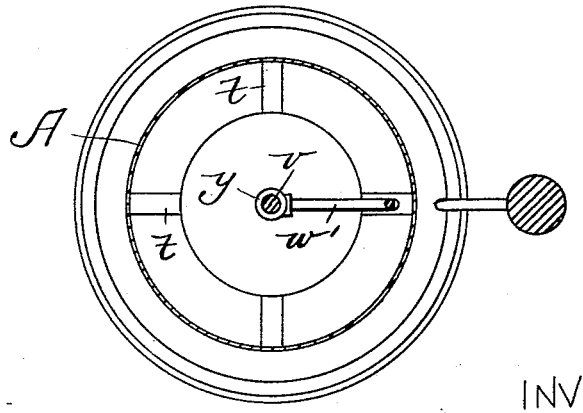

Figure 1 is a vertical transverse section of a coffee-pot provided with my improved extracting apparatus; Fig. 2, a horizontal section of the same, taken on line 2 2 in Fig. 1; and Fig. 3, a sectional elevation illustrating a modification.

Like letters of reference indicate corresponding parts in the different figures of the drawings.

My invention relates especially to a device adapted for use with tea and coffee pots of ordinary construction, whereby the desirable elements of the tea or coffee, as the case may be, may be quickly expressed and the residue held in such condition thereafter as to prevent to a great degree the action of the hot water upon it until a further supply of the liquid is desired.

The nature and operation of my improvement will be readily understood by those conversant with such matters from the following explanation:

In the drawings, A represents the body of a coffee-pot of ordinary construction. My apparatus comprises, primarily, a cylindrical cup B, supported on legs $t$, so formed as to readily enter the body of the pot A. The cup B has a double bottom $d$ $d^2$, of perforated material, the inner wall $d^2$ being removable, if desired, and between the bottom walls charcoal $f$ or other suitable filtering substance, as felt, is disposed. The cup is closed by a screw-cover $i$. Centrally through the top of this cover $i$ there is a plunger-rod fitted to slide vertically, said rod passing through the cover $j$ of the pot A. The rod $v$ carries a plunger $p$, which fits closely in the cylindrical body of the cup, so closely, in fact, as to substantially form a piston. Said plunger-rod $v$ where it passes centrally through the cover $j$ of the pot A is suitably guided at $w$ by a tube which is integral with said cover and from the inner end of which brass rods $x$ extend. The plunger-rod is provided with a screw-knob or handle $m$, removable so that the cover of the pot may be detachable from said rod, if desired.

An arc-shaped brace $w'$ has at one end a ring or eye $y$, rigidly secured to the cover $i$ of the cup and through which the plunger-rod passes. The opposite end has also an eye $y^2$ in alinement with said first eye and through which the plunger-rod also passes. This second eye $y^2$ is normally disposed within a very short distance from the inner end of tube $w$ on the pot-cover $j$. This is so that when the plunger-rod is drawn outward the friction of the plunger in the cup will lift it, and by having the eye $y^2$ located as described it will engage tube $w$ and act as a stop for the cup. Moreover, said curved brace $w'$ serves as a handle, whereby the cover of the cup may be held while the body is being screwed onto it after refilling or emptying.

In the use of my improvement the tea or coffee to be leached is disposed in the cup B and the cover $i$ screwed thereon. The whole is then disposed in the pot A, and the bottom $d$ is supported a material distance from the bottom of said pot by the legs $t$. Boiling water is poured into the pot in the usual manner and can be drawn through the bottom $d$ to act on the contents of the cup by reciprocating the plunger $p$. By depressing the plunger-rod $v$ the plunger $p$ is driven against the tea or coffee, compressing the same and expressing the liquid through the filtering-bottom into the body of the pot. While the contents of the cup is thus compressed, the water surrounding it cannot enter. To again leach the coffee, the plunger is retracted, permitting the water to be drawn in. This operation can be repeated as often as desired. I do not confine myself to using any particular filtering material $f$ in the bottom of the cup. The side walls of the cup may be perforated to render the device quicker in action, if desired.

It will be seen that the mechanism described can readily be moved for cleaning. Moreover, all danger of grounds or sediment in the liquid coffee is done away with. By making the inner wall $d^2$ of the bottom detachable the material $f$ may easily be removed; or said material may be entirely omitted as the double walls will serve to useful degree the same purpose.

Having thus explained my invention, what I claim is—

The pot and its cover in combination with the cup provided with legs and a double foraminous bottom; the cover for said cup; the curved handle secured to said cup-cover and provided with an eye in its upper end for engaging the pot-cover; the plunger-rod mounted to work in said eye and covers; and the plunger on said rod within said cup all being arranged to operate substantially as described.

R. H. HASLAM.

Witnesses:
　CHAS. L. BARNARD,
　DAVID DEAN.